(12) United States Patent
Sasaki et al.

(10) Patent No.: US 10,634,043 B2
(45) Date of Patent: Apr. 28, 2020

(54) ELECTRIC DEVICE AND ELECTRIC SUPERCHARGER

(71) Applicant: IHI Corporation, Koto-ku (JP)

(72) Inventors: Yuji Sasaki, Tokyo (JP); Takashi Yoshida, Tokyo (JP); Tatsumi Inomata, Tokyo (JP); Kuniaki Iizuka, Tokyo (JP)

(73) Assignee: IHI Corporation, Koto-ku (JP)

( * ) Notice: Subject to any disclaimer, the term of this patent is extended or adjusted under 35 U.S.C. 154(b) by 9 days.

(21) Appl. No.: 16/031,358

(22) Filed: Jul. 10, 2018

(65) Prior Publication Data

US 2018/0320583 A1    Nov. 8, 2018

Related U.S. Application Data

(63) Continuation of application No. PCT/JP2017/005171, filed on Feb. 13, 2017.

(30) Foreign Application Priority Data

Feb. 19, 2016   (JP) .................................. 2016-029593

(51) Int. Cl.
*F02B 39/10* (2006.01)
*H02K 7/14* (2006.01)
(Continued)

(52) U.S. Cl.
CPC ............ *F02B 39/10* (2013.01); *F01D 25/183* (2013.01); *F04D 17/10* (2013.01);
(Continued)

(58) Field of Classification Search
CPC .. F04D 17/10; F04D 25/0606; F04D 25/0633; F04D 25/0693; F02B 39/10;
(Continued)

(56) References Cited

U.S. PATENT DOCUMENTS 4,234,293 A    11/1980 Lightle, Jr.
5,518,427 A    5/1996 Kan et al.
(Continued)

FOREIGN PATENT DOCUMENTS

CN    1035590 A    9/1989
CN    102678558    9/2012
(Continued)

OTHER PUBLICATIONS

Office Action dated Jul. 23, 2019 in Japanese Patent Application No. 2018-500105, citing documents AA-AB and AO-AQ therein, 8 pages. (with English translation).
(Continued)

*Primary Examiner* — Mark A Laurenzi
*Assistant Examiner* — Mickey H France
(74) *Attorney, Agent, or Firm* — Oblon, McClelland, Maier & Neustadt, L.L.P.

(57) ABSTRACT

An electric device includes a partition wall configured to partition between a motor chamber having a relatively high pressure and an inverter chamber having a relatively low pressure; an inverter, which is provided in the inverter chamber, and is configured to supply power; a motor, which is provided in the motor chamber, and is configured to operate with supply of power from the inverter; and a bus-bar device, which is mounted to the partition wall by being inserted into a partition wall through hole formed in the partition wall, and is configured to connect the inverter and the motor to each other. The bus-bar device includes a bus bar configured to connect the inverter and the motor to each other; a plate portion into which the bus bar is inserted; and a resin portion.

14 Claims, 4 Drawing Sheets

(51) Int. Cl.

| | |
|---|---|
| *H02K 5/22* | (2006.01) |
| *H02K 21/14* | (2006.01) |
| *F04D 25/06* | (2006.01) |
| *H02K 11/33* | (2016.01) |
| *F04D 17/10* | (2006.01) |
| *H02M 7/48* | (2007.01) |
| *H02K 11/30* | (2016.01) |
| *F01D 25/18* | (2006.01) |
| *F04D 29/04* | (2006.01) |
| *H02B 1/20* | (2006.01) |
| *H02G 5/10* | (2006.01) |

(52) U.S. Cl.
CPC ..... *F04D 25/0606* (2013.01); *F04D 25/0693* (2013.01); *F04D 29/04* (2013.01); *H02B 1/20* (2013.01); *H02K 5/22* (2013.01); *H02K 5/225* (2013.01); *H02K 7/14* (2013.01); *H02K 11/30* (2016.01); *H02K 11/33* (2016.01); *H02K 21/14* (2013.01); *H02M 7/48* (2013.01); *H02G 5/10* (2013.01)

(58) Field of Classification Search
CPC .......... F01D 25/183; H02K 7/18; H02K 5/20; H02K 5/22; H02K 11/30; H02K 7/14; H02B 1/20; H02M 7/48
USPC ..... 290/52; 417/410.1, 407; 123/528, 559.1, 123/565; 60/598, 607
See application file for complete search history.

(56) References Cited

U.S. PATENT DOCUMENTS

| | | | |
|---|---|---|---|
| 2009/0004032 A1 | 1/2009 | Kaupert | |
| 2009/0104055 A1 | 4/2009 | Satou et al. | |
| 2012/0228023 A1 | 9/2012 | Fukasaku et al. | |
| 2014/0090626 A1* | 4/2014 | An | H02K 5/1732 123/565 |
| 2017/0152792 A1* | 6/2017 | Hornbach | F02B 39/10 |

FOREIGN PATENT DOCUMENTS

| | | |
|---|---|---|
| CN | 102756453 A | 10/2012 |
| DE | 10 2012 203 494 A1 | 9/2012 |
| DE | 10 2014 200 113 A1 | 7/2014 |
| GB | 2 257 579 A | 1/1993 |
| JP | 53-135013 A | 11/1978 |
| JP | 61-17495 U | 1/1986 |
| JP | 61-17496 U | 1/1986 |
| JP | 2000-311727 | 11/2000 |
| JP | 3110494 | 11/2000 |
| JP | 2004-242472 | 8/2004 |
| JP | 2005-220762 | 8/2005 |
| JP | 2007-124751 | 5/2007 |
| JP | 4179697 | 11/2008 |
| JP | 2009-097473 | 5/2009 |
| JP | 2011-223775 | 11/2011 |
| JP | 2012-186969 | 9/2012 |
| JP | 2013-24059 A | 2/2013 |
| JP | 2014-055545 | 3/2014 |
| JP | 2014-134149 | 7/2014 |
| JP | 2014-522935 | 9/2014 |
| JP | 2015-035881 | 2/2015 |
| JP | 2015-137548 | 7/2015 |

OTHER PUBLICATIONS

International Search Report dated Apr. 11, 2017 in PCT/JP2017/005171 filed Feb. 13, 2017 (with English Translation).
International Preliminary Report on Patentability and Written Opinion dated Aug. 30, 2018 in PCT/JP2017/005171 (English Translation only), 9 pages.
Combined Chinese Office Action and Search Report dated Oct. 9, 2019 in corresponding Chinese Patent Application No. 201780006264.X (with English Translation and English Translation of Category of Cited Documents) citing documents AO and AP therein, 16 pages.

* cited by examiner

ELECTRIC DEVICE AND ELECTRIC SUPERCHARGER

CROSS REFERENCE TO RELATED APPLICATIONS

This application is a continuation application of International Application No. PCT/JP2017/005171, filed on Feb. 13, 2017, which claims priority to Japanese Patent Application No. 2016-029593, filed on Feb. 19, 2016, the entire contents of which are incorporated by reference herein.

BACKGROUND ART

Technical Field

The present disclosure relates to an electric device and an electric supercharger in which a power supply device configured to supply power and an operation device configured to operate with supply of power are connected to each other by a bus bar through a partition wall configured to partition between a high-pressure space having a relatively high pressure and a low-pressure space having a relatively low pressure.

Related Art

Hitherto, in an electric device, an inverter configured to supply power and a motor configured to operate with supply of power from the inverter are provided in different spaces through intermediation of a partition wall. In the electric device, a bus bar is inserted into a through hole formed in the partition wall. As the electric device, there has been proposed an electric device in which the inverter and the motor are connected to each other by bus bars (for example, see Patent Literature 1).

CITATION LIST

Patent Literature

Patent Literature 1: Japanese Patent Application Laid-Open No. JP 2011-223775

SUMMARY

Technical Problem

Incidentally, there is a case in which, in the electric device, the operation device such as the motor and the power supply device such as the inverter are provided in a high-pressure space having a relatively high pressure and a low-pressure space having a relatively low pressure, respectively. In such a case, in the electric device described in Patent Literature 1 mentioned above, a gap is formed between the through hole formed in the partition wall and the bus bar. Therefore, there arises a problem in that the high-pressure space cannot be sealed.

An object of the present disclosure is to provide an electric device and an electric supercharger, which are capable of improving sealing performance for a high-pressure space and a low-pressure space.

Solution to Problem

In order to solve the above-mentioned problem, according to one embodiment of the present disclosure, there is provided an electric device, including: a partition wall configured to partition between a high-pressure space having a relatively high pressure and a low-pressure space having a relatively low pressure; a power supply device, which is provided in one of the high-pressure space and the low-pressure space, and is configured to supply power; an operation device, which is provided in another one of the high-pressure space and the low-pressure space, and is configured to operate with supply of power from the power supply device; and a bus-bar device, which is mounted to the partition wall by being inserted into a partition wall through hole formed in the partition wall, and is configured to connect the power supply device and the operation device to each other, wherein the bus-bar device includes: a bus bar configured to connect the power supply device and the operation device to each other; a plate portion into which the bus bar is inserted; and a resin portion, which is non-conductive, is filled between the plate portion and the bus bar, and is configured to allow the bus bar to be mounted to the plate portion, and wherein the plate portion of the bus-bar device is arranged on the high-pressure space side.

The electric device may further include a seal portion arranged between the plate portion and the partition wall.

The bus bar may be included a plurality of bus bars each being inserted into the plate portion with a gap, and that the resin portion may be filled between the plate portion and each of the plurality of bus bars and between the plurality of bus bars, and be configured to allow the plurality of bus bars to be mounted to the plate portion.

The bus-bar device may have a thread groove, which is opened on the low-pressure space side, and is prevented from penetrating into the high-pressure space side, and that a bolt corresponding to the thread groove be arranged on the low-pressure space side over the partition wall.

The bus-bar device may further include an insert nut having the thread groove.

The bus-bar device may further include a cap nut arranged on the high-pressure space side with respect to the insert nut.

The plate portion, the resin portion, and the thread groove may be integrally formed of a non-conductive member.

The power supply device may include an inverter, that the operation device may include a motor, and that the electric device may include an electric supercharger further including a compressor impeller mounted to one end of a shaft being a rotor of the motor.

The electric device may further include a partition portion configured to separate between the high-pressure space and a space in which the compressor impeller is provided, and that the partition portion further have a partition through hole for allowing communication between the high-pressure space and the space in which the compressor impeller is provided.

In order to solve the above-mentioned problem, according to one embodiment of the present disclosure, there is provided an electric supercharger, including: a compressor impeller; a shaft having one end to which the compressor impeller is mounted; a motor configured to drive the shaft to rotate; an inverter configured to supply power to the motor; a first space, which receives the motor, and communicates with the compressor impeller; a second space which receives the inverter; a partition wall, which is configured to partition between the first space and the second space, and has a partition wall through hole; a plate portion, which is mounted to the first space side of the partition wall through hole, and has a bus-bar through hole; a bus bar inserted into the bus-bar through hole; and a resin portion, which is non-conductive, and is provided between the bus bar and the bus-bar through hole.

The plate portion may have a thread groove which is prevented from penetrating through the plate portion, and that a bolt, which is inserted from the second space side, and the thread groove be threadedly engaged with each other.

Effects of Disclosure

According to the present disclosure, sealing performance for the high-pressure space and the low-pressure space can be improved.

DESCRIPTION OF EMBODIMENT

Figure 1:
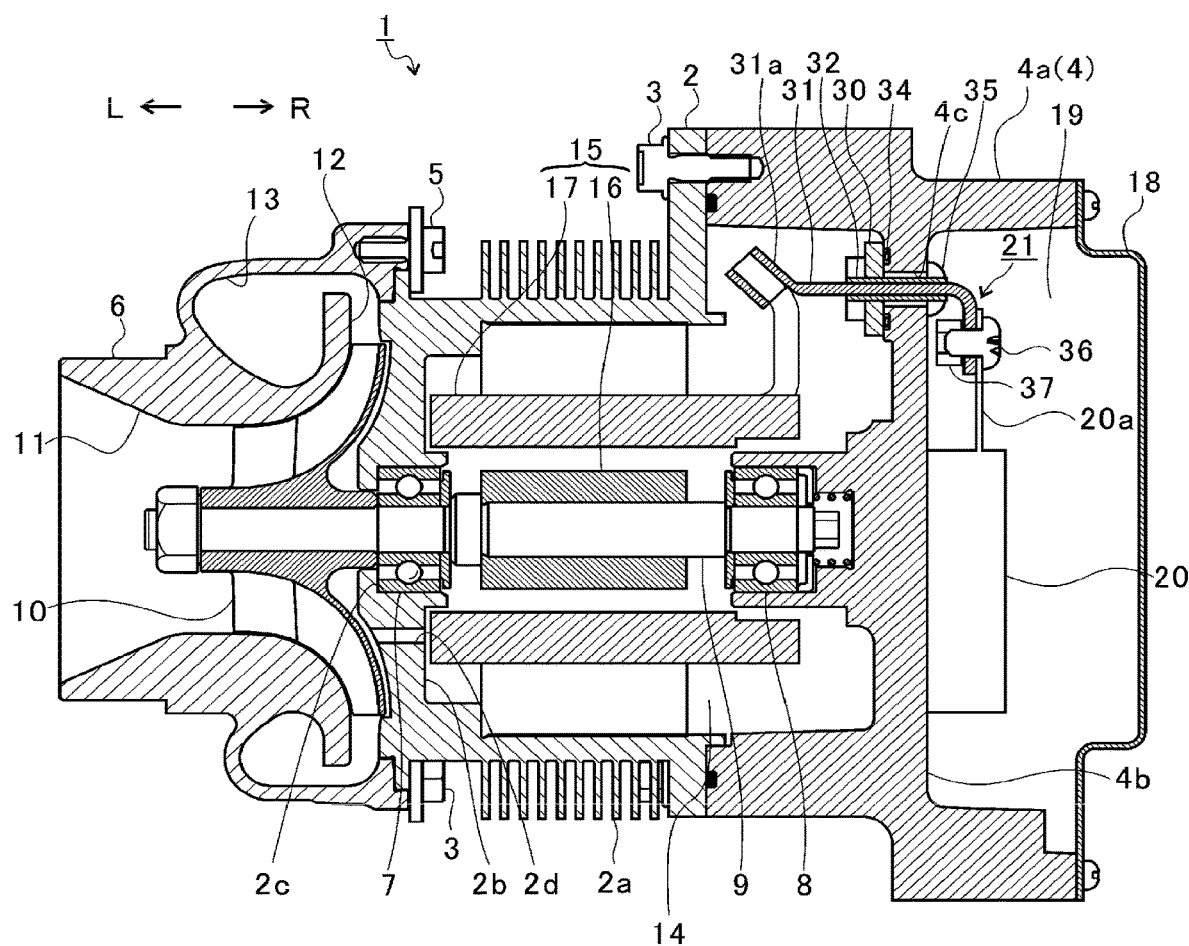
FIG. 1 is a schematic sectional view of an electric supercharger.

Now, with reference to the attached drawings, an embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of an electric supercharger 1. In the following description, the direction indicated by the arrow L illustrated in FIG. 1 corresponds to a left side of the electric supercharger 1. Further, the direction indicated by the arrow R illustrated in FIG. 1 corresponds to a right side of the electric supercharger 1. As illustrated in FIG. 1, the electric supercharger 1 (electric device) includes a motor housing 2, an inverter housing 4, and a compressor housing 6. The inverter housing 4 is coupled to the right side of the motor housing 2 by a fastening bolt 3. The compressor housing 6 is coupled to the left side of the motor housing 2 by fastening mechanisms 5.

The motor housing 2 includes a main body portion 2a and a partition portion 2b, which are formed integrally with each other. The main body portion 2a has a substantially tubular shape extending in a right-and-left direction. The partition portion 2b has one end on the compressor housing 6 side extending toward a center direction. The partition portion 2b has a bearing through hole 2c penetrating through the partition portion 2b in the right-and-left direction. The main body portion 2a has, on an outer surface thereof, a plurality of heat-radiating fins formed so as to protrude. With this configuration, the main body portion 2a improves cooling efficiency of the motor housing 2 with use of ambient air. Further, a bearing 7 is provided in the bearing through hole 2c of the motor housing 2.

The inverter housing 4 includes a main body portion 4a having a tubular shape and a partition wall 4b, which are formed integrally with each other. The main body portion 4a extends in the right-and-left direction. The partition wall 4b extends, at its substantial center in the right-and-left direction, toward the center direction. A bearing 8 is provided on the motor housing 2 side (left side) in the partition wall 4b.

In the electric supercharger 1, the bearing 7 provided to the motor housing 2 and the bearing 8 provided to the inverter housing 4 axially support a shaft 9 so that the shaft 9 is rotatable. A compressor impeller 10 is integrally mounted to a left end portion of the shaft 9. The compressor impeller 10 is received in the compressor housing 6 so as to be rotatable.

The compressor housing 6 has a suction port 11. The suction port 11 is opened on the right side of the electric supercharger 1. The suction port 11 is connected to an air cleaner (not shown). Further, under a state in which the motor housing 2 and the compressor housing 6 are coupled to each other by the fastening mechanisms 5, a diffuser flow passage 12 is formed. In the diffuser flow passage 12, the air is increased in pressure by opposed surfaces of the motor housing 2 and the compressor housing 6. The diffuser flow passage 12 is annularly formed so as to extend from a radially inner side to a radially outer side of the shaft 9. The diffuser flow passage 12 communicates with the suction port 11 on the radially inner side of the shaft 9 through intermediation of the compressor impeller 10.

Further, an annular compressor scroll flow passage 13 is provided to the compressor housing 6. The compressor scroll flow passage 13 is positioned on the radially outer side of the shaft 9 with respect to the diffuser flow passage 12. The compressor scroll flow passage 13 communicates with a suction port of an engine (not shown). The compressor scroll flow passage 13 communicates also with the diffuser flow passage 12. Thus, rotation of the compressor impeller 10 causes air to be sucked into the compressor housing 6 through the suction port 11. The sucked air is increased in speed by an action of a centrifugal force in the course of flowing through blades of the compressor impeller 10. The air having been increased in speed is increased in pressure in the diffuser flow passage 12 and the compressor scroll flow passage 13. The air having been increased in pressure is led to a suction port of the engine.

Moreover, in the electric supercharger 1, under a state in which the motor housing 2 and the inverter housing 4 are coupled to each other by the fastening bolt 3, a motor chamber 14 is formed. The motor chamber 14 is a space surrounded by the motor housing 2 and the inverter housing 4. In the motor chamber 14, a motor 15 is provided.

The motor 15 is a so-called three-phase permanent magnet synchronous motor. The motor 15 includes permanent magnets 16 and a stator 17. A plurality of permanent magnets 16 are provided on an outer peripheral surface of the shaft 9 between the bearing 7 and the bearing 8 so as to be rotated integrally with the shaft 9. The shaft 9 and the permanent magnets 16 serve as a rotor of the motor 15. For the stator 17, there are provided U-phase, V-phase, and W-phase coils each having a wire wound therearound on an inner peripheral surface of the main body portion 2a of the motor housing 2.

Moreover, in the electric supercharger 1, a cover portion 18 is mounted to a right end portion of the inverter housing 4. A space surrounded by the inverter housing 4 and the cover portion 18 is formed as an inverter chamber 19. In the inverter chamber 19, an inverter 20 is provided.

Further, in the electric supercharger 1, a bus-bar device 21 is mounted to the partition wall 4b of the inverter housing 4. The bus-bar device 21 connects the wires of the stator 17 and the inverter 20 to each other. Specifically, the partition wall 4b of the inverter housing 4 has partition wall through holes 4c penetrating through the partition wall 4b in the right-and-left direction. The bus-bar device 21 is provided so as to extend between the motor chamber 14 and the inverter chamber 19 through the partition wall through holes 4c. The bus-bar device 21 is to be described later in detail.

In the electric supercharger 1, power (for example, 100 A or more) is supplied to the wires of the stator 17 from the inverter 20 through the bus-bar device 21. With the supply of power, the compressor impeller 10 is rotated integrally with the shaft 9 and the permanent magnets 16 by interaction of the coils of the stator 17 and the permanent magnets 16. When the compressor impeller 10 is rotated, as described above, the air is increased in pressure and led to the suction port of the engine.

A partition through hole 2d penetrates through the partition portion 2b of the motor housing 2 in the right-and-left direction. The air having been increased in pressure by a rotational force of the compressor impeller 10 passes through the partition through hole 2d and flows into the motor chamber 14. Therefore, a pressure difference between the pressure in the compressor housing 6 and the pressure in the motor chamber 14 is reduced. With this action, the electric supercharger 1 can be reduced in, for example, a thrust force in the leftward direction of the shaft 9.

Meanwhile, the inverter chamber 19 has an atmospheric pressure. Thus, the inverter chamber 19 has a pressure lower than the pressure in the motor chamber 14 formed through intermediation of the partition wall 4b. Therefore, when a gap is formed between the bus-bar device 21, which is configured to connect the wires of the stator 17 and the inverter 20 to each other, and each of the partition wall through holes 4c of the partition wall 4b, the air supplied to the motor chamber 14 may flow into the inverter chamber 19.

In view of the above-mentioned circumstance, the electric supercharger 1 has the following configuration to prevent inflow of the air into the inverter chamber 19 through the gap between the bus-bar device 21 and each of the partition wall through holes 4c of the partition wall 4b.

Figure 2A:
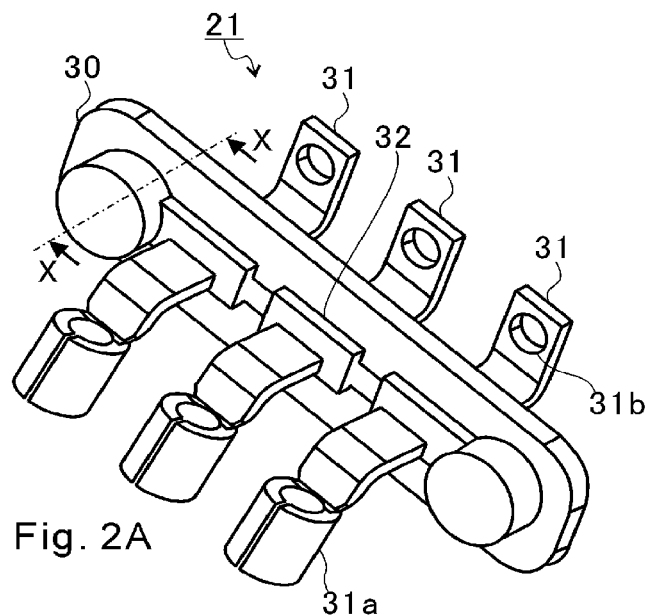
FIG. 2A is a perspective view of a bus-bar device as seen from a motor chamber side.
Figure 2B:
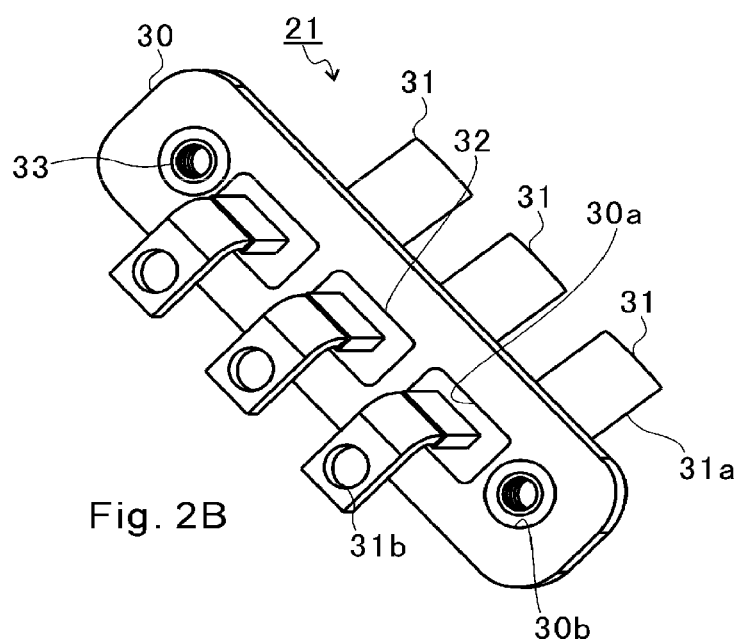
FIG. 2B is a perspective view of the bus-bar device as seen from an inverter chamber side.
Figure 2C:
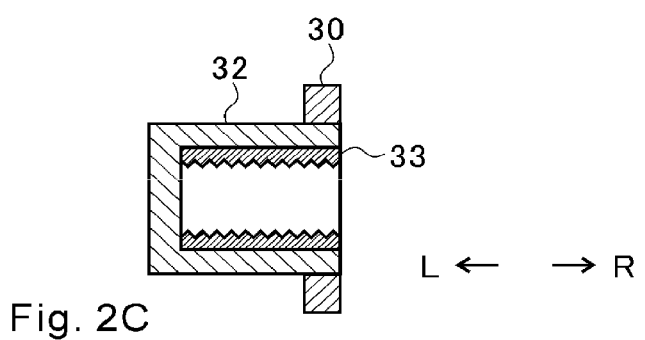
FIG. 2C is a sectional view taken along the line X-X in FIG. 2A.

FIG. 2A is a perspective view of the bus-bar device 21 as seen from the motor chamber 14 side. FIG. 2B is a perspective view of the bus-bar device 21 as seen from the inverter chamber 19 side. FIG. 2C is a sectional view taken along the line X-X in FIG. 2A.

As illustrated in FIG. 2A and FIG. 2B, the bus-bar device 21 includes a plate portion 30, bus bars 31, a resin portion 32, and insert nuts 33. The plate portion 30 is a substantially rectangular-parallelepiped flat plate made of a metal material. The plate portion 30 has bus-bar through holes 30a. Three bus bars 31 are inserted into the bus-bar through holes 30a of the plate portion 30, respectively. Further, the plate portion 30 has nut through holes 30b on both sides over the bus-bar through holes 30a. The insert nuts 33 each having a thread groove are fitted to the nut through holes 30b, respectively. The material of the plate portion 30 is not limited to the metal material, and may be, for example, a resin material. In the case of employing the resin material, the plate portion 30 and the resin portion 32 mentioned above are molded integrally with each other.

The bus bars 31 each are a flat plate made of a conductive metal material (for example, copper). The bus bars 31 each integrally have a terminal portion 31a having a cylindrical shape. The terminal portions 31a are formed at one ends of the bus bars 31 on the motor chamber 14 side. Further, another ends of the bus bars 31, which are arranged on the inverter chamber 19 side, each are bent into an L shape. The bus bars 31 each have a fastening through hole 31b on a terminal end side with respect to the bent portion.

The bus bars 31 are inserted into the bus-bar through holes 30a of the plate portion 30 with a clearance. When the bus-bar device 21 is mounted to the partition wall 4b of the electric supercharger 1, the insert nuts 33 protrude toward the motor chamber 14 side with respect to the nut through holes 30b of the plate portion 30. Under the state in which the bus bars 31 and the insert nuts 33 are inserted into the plate portion 30, the resin portion 32 of the bus-bar device 21 is formed. The resin portion 32 is formed by, for example, nano-molding of non-conductive resin. In other words, the resin portion 32 is formed by filling a space between the plate portion 30 and each of the bus bars 31 with resin (member). Further, the resin portion 32 is formed by filling a space between the plate portion 30 and each of the insert nuts 33 with resin.

The resin portion 32 allows the bus bars 31 to be mounted to the plate portion 30 without a gap. That is, the resin portion 32 allows the bus bars 31 to be mounted to the plate portion 30 without an air gap allowing communication between the motor chamber 14 and the inverter chamber 19. The resin portion 32 allows the insert nuts 33 to be mounted to the plate portion 30 without a gap. Further, as illustrated in FIG. 2C, the resin portion 32 closes end portions of the insert nuts 33 on the motor chamber 14 side (direction indicated by the arrow L in FIG. 2C). Thus, the thread grooves of the insert nuts 33 are opened on the inverter chamber 19 side. Moreover, the thread grooves of the insert nuts 33 do not penetrate into the motor chamber 14.

Referring back to FIG. 1, seal portions 34 are provided to the electric supercharger 1. The seal portions 34 are provided in ring grooves so as to surround the partition wall through holes 4c, respectively, on a side surface of the partition wall 4b of the inverter housing 4 on the motor chamber 14 side. For example, O-rings are employed as the seal portions 34.

When the bus-bar device 21 is to be mounted to the partition wall 4b of the inverter housing 4, the another end portions of the bus bars 31 are inserted from the motor chamber 14 side into the partition wall through holes 4c of the partition wall 4b, respectively. At this time, the bus bars 31 are mounted to the plate portion 30 so that all of the L-shaped portions formed on the another end portions of the three bus bars 31 are aligned in the same direction. Accordingly, the bus bars 31 can easily be inserted into the partition wall through holes 4c, respectively. Bolts 35 are threadedly engaged with the insert nuts 33 from the inverter chamber 19 side through the partition wall through holes 4c of the partition wall 4b under a state in which the plate portion 30 is held in abutment against the seal portion 34. With this action, the bus-bar device 21 is mounted to the partition wall 4b of the inverter housing 4.

Further, end portions of the wires of the stator 17 are joined to the terminal portions 31a of the bus bars 31 by fusion welding. With this action, the wires of the stator 17 and the bus bars 31 are connected to each other. Further, bolts 36 are inserted into the fastening through holes 31*b* (see FIG. 2) formed in the another end portions of the bus bars 31 and through holes formed in output terminals 20*a* of the inverter 20. After that, the nuts 37 are threadedly engaged with the bolts 36 from a side opposite to an insertion direction of the bolts 36. With this action, the inverter 20 and the bus bars 31 are connected to each other.

As described above, the bus-bar device 21 is mounted to the partition wall 4*b*. With this, the seal portion 34 is capable of providing a seal between the plate portion 30 and the partition wall 4*b*. Further, the resin portion 32 is capable of providing a seal between the plate portion 30 and each of the bus bars 31. Further, the resin portion 32 is formed by nano-molding so as to close end portions of the insert nuts 33 on the motor chamber 14 side. With this, the resin portion 32 is capable of providing a seal between the insert nuts 33 and the bolts 35.

Thus, when the wires of the stator 17 (motor 15) arranged in the motor chamber 14 having a relatively high pressure and the inverter 20 arranged in the inverter chamber 19 having a relatively low pressure are connected to each other through the partition wall 4*b*, the bus-bar device 21 is capable of preventing inflow of the air from the motor chamber 14 into the inverter chamber 19.

Further, the plate portion 30 of the bus-bar device 21 is mounted to the partition wall 4*b* from the motor chamber 14 side. Therefore, the bus-bar device 21 is pressed against the partition wall 4*b* by an internal pressure in the motor chamber 14 having a relatively high pressure. With this, sealing performance of the bus-bar device 21 can be improved.

As a method of providing a seal between the partition wall through hole 4*c* of the partition wall 4*b* and the bus bar 31, hermetic sealing (glass sealing) can be employed. However, hermetic sealing involves higher cost. Moreover, the hermetic sealing is applicable only to a bus bar having a columnar shape. Therefore, hermetic sealing causes increase in size of the device. In contrast, the bus-bar device 21 has a simple configuration obtained by providing the resin portion 32 to the plate portion 30 and the bus bars 31 being a flat plate by nano-molding. Further, the bus-bar device 21 is inexpensive and can be downsized.

Further, the bus bars 31 can be welded to the partition wall thorough holes 4*c* of the partition wall 4*b*. However, welding requires insulation between the partition wall 4*b* and each of the bus bars 31. Further, welding is expensive to apply. In contrast, the bus-bar device 21 has a simple configuration obtained by providing the resin portion 32 to the plate portion 30 and the bus bars 31 each being a flat plate by nano-molding of non-conductive resin (member). Thus, in the bus-bar device 21, insulation of the partition wall 4*b* and each of the bus bars 31 can be performed with the resin portion 32 in an inexpensive manner.

<First Modification Example>

Figure 3A:
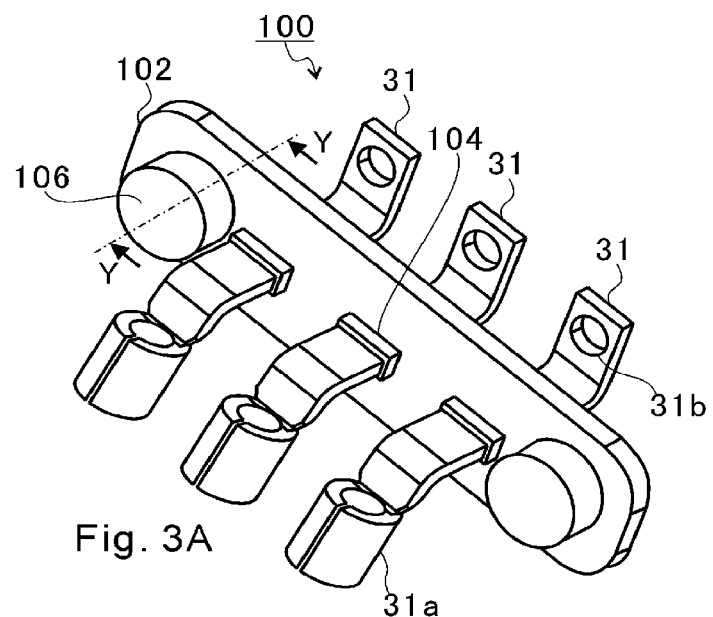
FIG. 3A is a perspective view of a bus-bar device as seen from the motor chamber side in a first modification example.
Figure 3B:
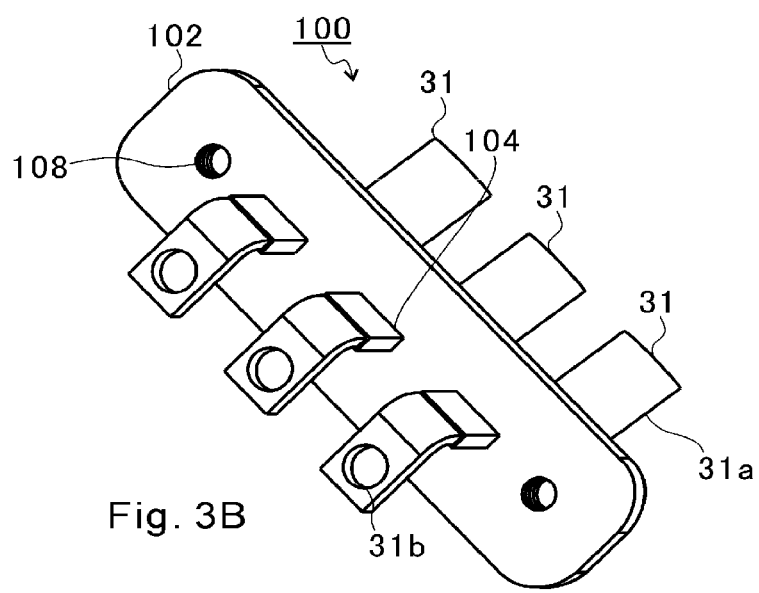
FIG. 3B is a perspective view of the bus-bar device as seen from the inverter chamber side in the first modification example.
Figure 3C:
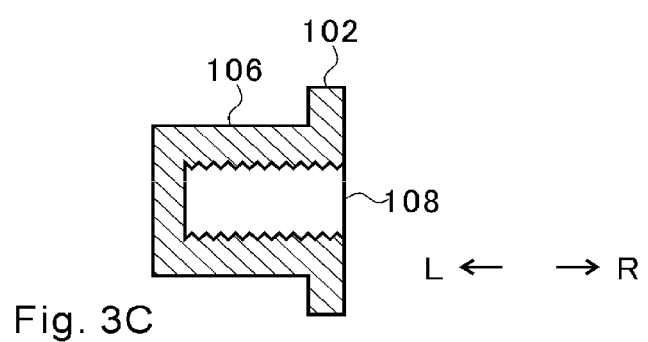
FIG. 3C is a sectional view taken along the line Y-Y in FIG. 3A.

FIG. 3A is a perspective view of a bus-bar device 100 as seen from the motor chamber 14 side. FIG. 3B is a perspective view of the bus-bar device 100 as seen from the inverter chamber 19 side. FIG. 3C is a sectional view taken along the line Y-Y in FIG. 3A. Components which are the same as those of the embodiment described above are denoted by the same reference symbols, and description thereof is omitted. In the following, description is made of a first modification example of the bus-bar device 21 in the embodiment described above.

As illustrated in FIG. 3A and FIG. 3B, the bus-bar device 100 includes a plate portion 102, bus bars 31, resin portions 104, and protruding portions 106. The plate portion 102, the resin portions 104, and the protruding portions 106 are integrally formed by nano-molding of resin.

The plate portion 102 has a substantially rectangular-parallelepiped flat plate-shape made of a metal material. Three bus bars 31 are mounted to the plate portion 102 through intermediation of the resin portions 104. Further, the plate portion 102 integrally has the protruding portions 106 on both sides over the three bus bars 31. The protruding portions 106 protrude toward the motor chamber 14 side on both sides over the three bus bars 31 on the plate portion 102. As illustrated in FIG. 3C, the protruding portions 106 each have a thread groove 108. End portions of the thread grooves 108 on the motor chamber 14 side (direction indicated by the arrow L in FIG. 3C) are closed.

When the bus-bar device 100 is to be mounted to the partition wall 4*b* of the inverter housing 4, the another end portions of the bus bars 31 are inserted from the motor chamber 14 side into the partition wall through holes 4*c* of the partition wall 4*b*, respectively. Then, under a state in which the plate portion 102 is held in abutment against the seal portions 34, the bolts 35 are threadedly engaged with the thread grooves 108 through the partition wall through holes 4*c* of the partition wall 4*b* from the inverter chamber 19 side. With this action, the bus-bar device 100 is mounted to the partition wall 4*b* of the inverter housing 4.

In such a manner, the bus-bar device 100 is mounted to the partition wall 4*b*. With this, the bus-bar device 100 is capable of providing a seal between the plate portion 102 and the partition wall 4*b* with the seal portions 34. Further, the bus-bar device 100 is capable of providing a seal between the plate portion 102 and each of the bus bars 31 with the resin portion 104. Moreover, the protruding portions 106 each have a thread groove 108 formed so that an end portion on the motor chamber 14 side is sealed. With this, the bus-bar device 100 is capable of providing a seal between the thread groove 108 and the bolt 35.

Thus, similarly to the bus-bar device 21 in the embodiment described above, the bus-bar device 100 is capable of preventing inflow of the air from the motor chamber 14 into the inverter chamber 19. Further, the bus-bar device 100 is capable of improving sealing performance.

<Second Modification Example>

Figure 4A:
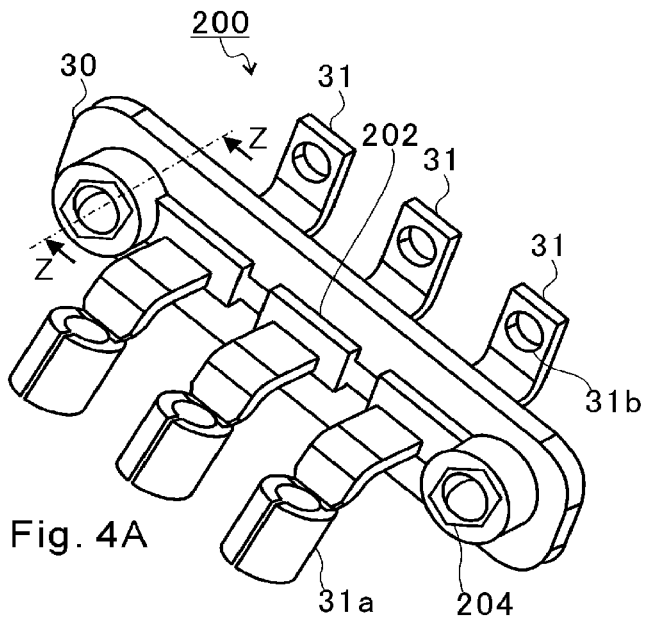
FIG. 4A is a perspective view of a bus-bar device as seen from the motor chamber side in a second modification example.
Figure 4B:
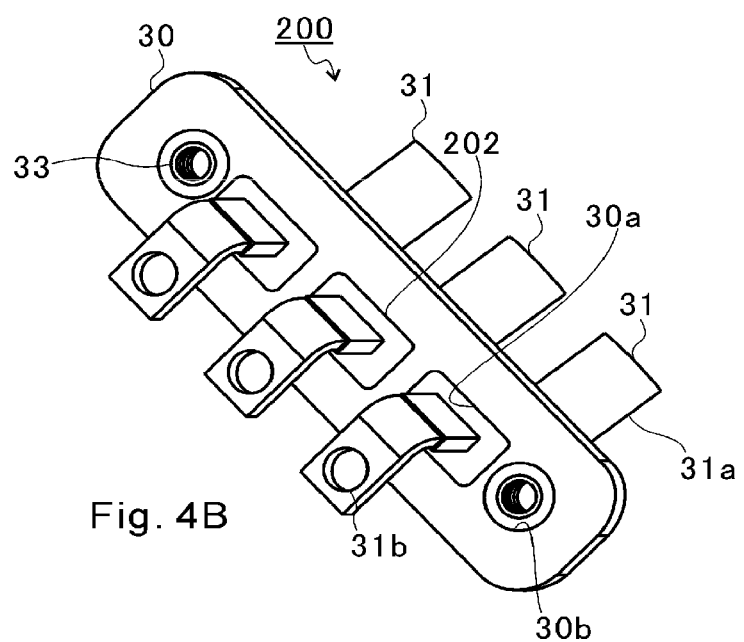
FIG. 4B is a perspective view of the bus-bar device as seen from the inverter chamber side in the second modification example.
Figure 4C:
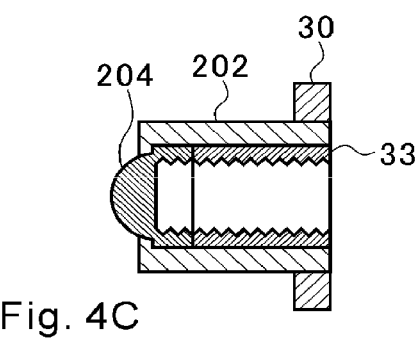
FIG. 4C is a sectional view taken along the line Z-Z in FIG. 4A.

FIG. 4A is a perspective view of a bus-bar device 200 as seen from the motor chamber 14 side. FIG. 4B is a perspective view of the bus-bar device 200 as seen from the inverter chamber 19 side. FIG. 4C is a sectional view taken along the line Z-Z in FIG. 4A. Components which are the same as those of the embodiment described above are denoted by the same reference symbols, and description thereof is omitted. In the following, description is made of a second modification example of the bus-bar device 21 in the embodiment described above.

As illustrated in FIG. 4A and FIG. 4B, the bus-bar device 200 includes the plate portion 30, the bus bars 31, resin portions 202, an insert nut 33, and a cap nut 204. The plate portion 30 is a rectangular-parallelepiped flat plate made of a metal material. The plate portion 30 has the bus-bar through holes 30*a*. Each of the bus-bar through holes 30*a* receives each one of three bus bars 31 inserted thereinto. The plate portion 30 has nut through holes 30*b* on both sides. The insert nut 33 and the cap nut 204 are mounted to each of the nut through holes 30*b* on both sides.

The bus bars 31 are inserted into the bus-bar through holes 30*a* of the plate portion 30, respectively. The insert nuts 33 are inserted into the nut through holes 30*b* of the plate portion 30, respectively. The insert nuts 33 protrude toward the motor chamber 14 side. The cap nuts 204 are arranged on the motor chamber 14 side of the insert nuts 33. The resin portion 202 is formed by nano-molding of non-conductive resin under a state in which the bus bars 31 and the insert nuts 33 are inserted into the plate portion 30 and in which the cap nuts 204 are arranged in the insert nuts 33. The resin portion 202 is formed by nano-molding of resin between the plate portion 30 and each of the bus bars 31. Further, the resin portion 202 is formed by nano-molding of resin between the plate portion 30 and each of the insert nut 33 and the cap nut 204.

The resin portion 202 allows the bus bars 31 to be mounted to the plate portion 30 without a gap. Further, the resin portion 202 allows the insert nuts 33 and the cap nuts 204 to be mounted to the plate portion 30 without a gap. As illustrated in FIG. 4C, the resin portion 202 is formed by nano-molding so that head portions of the cap nuts 204 are exposed.

Further, when the bus-bar device 200 is to be mounted to the partition wall 4b of the inverter housing 4, the another end portions of the bus bars 31 are inserted from the motor chamber 14 side into the partition wall through holes 4c of the partition wall 4b, respectively. Then, under a state in which the plate portion 30 is held in abutment against the seal portions 34, the bolts 35 are threadedly engaged with the insert nut 33 and the cap nuts 204 through the partition wall through holes 4c of the partition wall 4b from the inverter chamber 19 side. With this action, the bus-bar device 200 is mounted to the partition wall 4b of the inverter housing 4.

In such a manner, the bus-bar device 200 is mounted to the partition wall 4b. With this, the bus-bar device 200 is capable of providing a seal between the plate portion 30 and the partition wall surface 4b with the seal portions 34. Further, the bus-bar device 200 is capable of providing a seal between the plate portion 30 and each of the bus bars 31 with the resin portion 202. Moreover, with the cap nut 204, the bus-bar device 200 is capable of providing a seal between the insert nut 33 and the bolt 35.

Thus, similarly to the bus-bar device 21 in embodiment described above and the bus-bar device 100 in the first modification example, the bus-bar device 200 is capable of improving sealing performance.

The preferred embodiment of the present disclosure has been described above with reference to the attached drawings, but, needless to say, the embodiment of the present disclosure is not limited to the above-mentioned embodiment. It is apparent that those skilled in the art may arrive at various alternations and modifications within the scope of claims, and those examples are understood as naturally falling within the technical scope of the present disclosure.

For example, in the above-mentioned embodiment and the modification examples, description is made with the electric supercharger 1 as an example. However, this is merely an example. The present disclosure is applicable to various types of electric devices in which a power supply device configured to supply power and an operation device configured to operate with supply of power are connected to each other by the bus-bar device 21, 100, 200 through the partition wall 4b configured to partition between a high-pressure space having a relatively high pressure and a low-pressure space having a relatively low pressure.

Further, in the embodiment and the modification examples, description is made with the inverter 20 being the power supply device configured to supply power and the motor 15 being the operation device configured to operate with supply of power as an example. However, those are merely examples. Any power supply device configured to supply power may be employed. Moreover, any operation device configured to operate with supply of power may be employed.

Further, in the embodiment and the modification examples, the motor 15 being the operation device is provided in the high-pressure space (motor chamber 14 or first space) having a relatively high pressure. Further, the inverter 20 being the power supply device is provided in the low-pressure space (inverter chamber 19 or second space) having a relatively low pressure. However, not limited to this arrangement, it is only required that one of the operation device and the power supply device be provided in the high-pressure space, and that another of the operation device and the power supply device be provided in the low-pressure space.

Further, in the embodiment and the modification examples, the terminal portion 31a is provided to one end of the bus bar 31. Moreover, the another end of the bus bar 31 is bent into the L shape and has the fastening through hole 31b. However, the shape of the bus bar 31 is not limited to this shape, and another shape may be employed.

Further, in the embodiment and the modification examples, the three bus bars 31 are provided. However, any number of the bus bars 31 may be provided. Moreover, the arrangement of the bus bars 31 is not limited to the arrangement on the substantially straight line, and may be an arrangement of being deviated from the straight line or being provided at vertices of a polygon, depending on the plate portion 30.

Further, in the embodiment and the modification examples, the substantially rectangular-parallelepiped flat plate is provided as the plate portion 30. However, the shape of the plate portion 30 is not limited to this. For example, depending on the arrangement of the bus bars 31, the plate portion 30 may have a flat-plate shape with a bottom surface having an oval shape, a polygonal shape such as a rectangular shape, or a fan shape. Further, the arrangement of the bolts 35 is not limited to two positions, and may be three or more positions. The bolt 35 may be provided at one position as long as predetermined sealing performance can be secured.

Further, in the embodiment and the modification examples, description is made of the bearing 7 provided to the motor housing 2 and the bearing 8 provided to the inverter housing 4 as the components of the electric supercharger. For example, employment of a slide bearing or a rolling bearing for the bearing 7 and the bearing 8 may be considered. Specifically, as illustrated in FIG. 1, the ball bearing lubricated with grease may be employed as an example of the rolling bearing. In this case, for example, when the above-mentioned partition through hole 2d is formed, air having passed through the partition through hole 2d and increased in pressure flows into the motor chamber 14, to thereby suppress entry of air into the bearing arranged on a radially inner side of the bearing through hole 2c. The grease is prevented from being brought to the outside of the bearing by a flow given when the air passes through the inside of the bearing, thereby being capable of improving durability of a bearing function.

Further, in the embodiment and the modification examples, description is made of the bus-bar devices 21, 100, and 200. However, not limited to this, it is only required that at least the bus bar 31 connecting the power supply device (inverter 20) and the operation device (motor 15) to each other, the plate portion 30 having the bus bar 31 inserted thereinto, and the non-conductive resin portion 32 filled between the plate portion 30 and the bus bar 31 be provided.

Further, in the embodiment and the modification examples, description is made of the plate portion 30, 102 made of a metal material. However, not limited to the metal material, the plate portion 30, 102 may be made of, for example, a resin material. In the case of using the resin material, the plate portion 30, 102 and the above-mentioned resin portion 32, 104, 202 are integrally molded.

INDUSTRIAL APPLICABILITY

The present disclosure is applicable to an electric device and an electric supercharger in which a power supply device configured to supply power and an operation device configured to operate with supply of power are connected to each other by a bus bar through a partition wall configured to partition between a high-pressure space having a relatively high pressure and a low-pressure space having a relatively low pressure.

What is claimed is:

1. An electric device, comprising:
   a partition wall configured to partition between a high-pressure space having a relatively high pressure and a low-pressure space having a relatively low pressure;
   a power supply device, which is provided in one of the high-pressure space and the low-pressure space, and is configured to supply power;
   an operation device, which is provided in another one of the high-pressure space and the low-pressure space, and is configured to operate with supply of power from the power supply device; and
   a bus-bar device, which is mounted to the partition wall by being inserted into a partition wall through hole formed in the partition wall, and is configured to connect the power supply device and the operation device to each other,
   the bus-bar device including:
      a bus bar configured to connect the power supply device and the operation device to each other;
      a plate portion into which the bus bar is inserted;
      a resin portion, which is non-conductive, is filled between the plate portion and the bus bar, and is configured to allow the bus bar to be mounted to the plate portion; and
      a thread groove, which is opened on the low-pressure space side, and is prevented from penetrating into the high-pressure space side,
   the plate portion of the bus-bar device is arranged on the high-pressure space side, and
   a bolt corresponding to the thread groove is arranged on the low-pressure space side over the partition wall.

2. The electric device according to claim 1, further comprising:
   a seal portion arranged between the plate portion and the partition wall.

3. The electric device according to claim 1,
   wherein the bus bar comprises a plurality of bus bars each being inserted into the plate portion with a gap, and
   wherein the resin portion is filled between the plate portion and each of the plurality of bus bars and between the plurality of bus bars, and is configured to allow the plurality of bus bars to be mounted to the plate portion.

4. The electric device according to claim 1,
   wherein the bus-bar device further comprises an insert nut having the thread groove.

5. The electric device according to claim 4,
   wherein the bus-bar device further comprises a cap nut arranged on the high-pressure space side with respect to the insert nut.

6. The electric device according to claim 1,
   wherein the plate portion, the resin portion, and the thread groove are integrally formed of a non-conductive member.

7. The electric device according to claim 1,
   wherein the power supply device comprises an inverter,
   wherein the operation device comprises a motor, and
   wherein the electric device comprises an electric supercharger further including a compressor impeller mounted to one end of a shaft being a rotor of the motor.

8. The electric device according to claim 7, further comprising:
   a partition portion configured to separate between the high-pressure space and a space in which the compressor impeller is provided,
   wherein the partition portion has a partition through hole for allowing communication between the high-pressure space and the space in which the compressor impeller is provided.

9. An electric supercharger, comprising:
   a compressor impeller;
   a shaft having one end to which the compressor impeller is mounted;
   a motor configured to drive the shaft to rotate;
   an inverter configured to supply power to the motor;
   a first space, which receives the motor, and communicates with the compressor impeller;
   a second space which receives the inverter;
   a partition wall, which is configured to partition between the first space and the second space, and has a partition wall through hole;
   a plate portion, which is mounted to the first space side of the partition wall through hole, and has a bus-bar through hole;
   a bus bar inserted into the bus-bar through hole; and
   a resin portion, which is non-conductive, and is provided between the bus bar and the bus-bar through hole,
   the plate portion has a thread groove which is prevented from penetrating through the plate portion, and
   a bolt, which is inserted from the second space side, and the thread groove are threadedly engaged with each other.

10. The electric device according to claim 2,
    wherein the bus bar comprises a plurality of bus bars each being inserted into the plate portion with a gap, and
    wherein the resin portion is filled between the plate portion and each of the plurality of bus bars and between the plurality of bus bars, and is configured to allow the plurality of bus bars to be mounted to the plate portion.

11. The electric device according to claim 10,
    wherein the power supply device comprises an inverter,
    wherein the operation device comprises a motor, and
    wherein the electric device comprises an electric supercharger further including a compressor impeller mounted to one end of a shaft being a rotor of the motor.

12. The electric device according to claim 11, further comprising:

a partition portion configured to separate between the high-pressure space and a space in which the compressor impeller is provided,
wherein the partition portion has a partition through hole for allowing communication between the high-pressure space and the space in which the compressor impeller is provided.

13. The electric device according to claim 2,
wherein the power supply device comprises an inverter,
wherein the operation device comprises a motor, and
wherein the electric device comprises an electric supercharger further including a compressor impeller mounted to one end of a shaft being a rotor of the motor.

14. The electric device according to claim 13, further comprising:
a partition portion configured to separate between the high-pressure space and a space in which the compressor impeller is provided,
wherein the partition portion has a partition through hole for allowing communication between the high-pressure space and the space in which the compressor impeller is provided.

* * * * *